Patented June 9, 1953

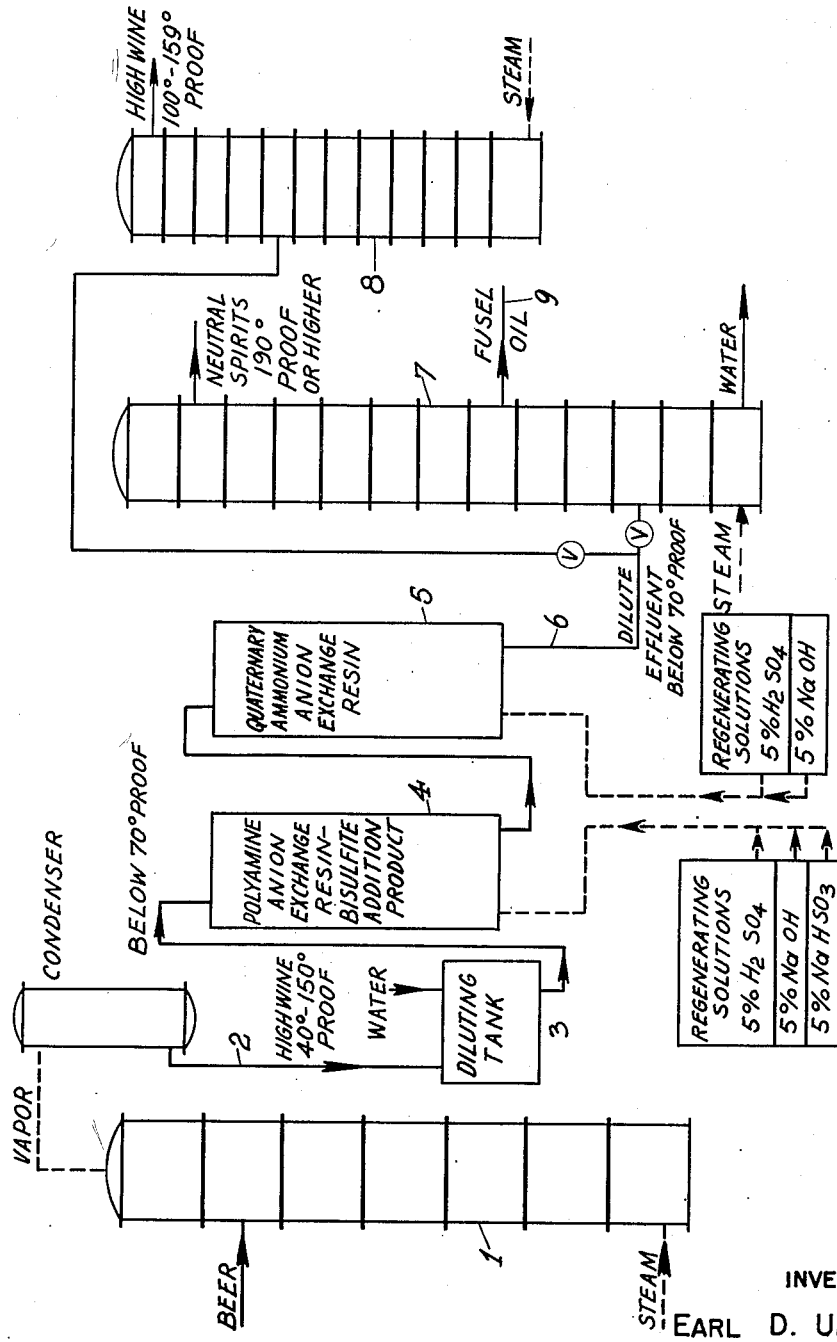

2,641,543

UNITED STATES PATENT OFFICE 2,641,543

ION EXCHANGE TREATMENT OF ALCOHOL SOLUTIONS

Earl D. Unger, Le Roy A. Smith and Herman F. Willkie, Louisville, Ky., assignors to Joseph E. Seagram & Sons, Inc., Shively, Ky., a corporation of Indiana Application January 11, 1950, Serial No. 137,908

10 Claims. (Cl. 99—48)

In the production of distilled alcohol beverages the fermented mash or beer is distilled in an atmospheric pressure or vacuum still to obtain a distillate of higher alcohol content, usually about 40° to 150° proof, called a high wine or low wine in the whiskey art. For the purposes of this description, the term "high wine" will be employed to indicate an alcohol distillate having an alcohol content higher than that in the fermented mash from which it is distilled. If it is desired to obtain neutral spirits, the high wine is rectified with purification in a multi-column unit. This involves treatment in a purifying fractionating column from which the aldehydes and low boiling esters together with alcohol are drawn off at the top, and the high boiling esters and high boiling fusel oil fractions are removed by a side draw off. The alcohol is withdrawn from the base of the purifying column and is fed to an alcohol rectifying column. The top draw off from the purifying column is redistilled in a concentrating column, to obtain a concentrated heads fraction, the tail fraction containing alcohol being returned to the alcohol rectifying column. The fusel oil fraction is diluted with water to produce stratification and may be decanted. Thus, it is necessary to employ at least three columns in addition to the beer column to secure neutral spirits. As the multi-column distillation is costly, it is desirable to eliminate this step in the manufacture of neutral spirits. Also, it is desirable to provide an improved high wine in order to improve the quality of the aged whiskey produced therefrom.

An object of the invention is the provision of an ion exchange process for removing substantial quantities of aldehydes, ketones or both from solutions thereof.

Another object is the production of an ion exchange material having the ability to remove aldehydes, ketones or both from solutions thereof.

A further object is to obtain an improved high wine or raw whiskey from an alcohol solution by treatment with ion exchange materials.

Another object is the provision of an ion exchange process for substantially reducing the acid and aldehyde content of an alcohol distillate produced from a fermented sacchariferous mash.

Another object is the provision of an ion exchange process for substantially reducing the acid, ester and aldehyde content of an alcohol distillate.

According to one feature of the present invention, an alcohol solution, such as a clarified fermented mash, or a high wine, obtained from a fermented sacchariferous mash and containing congeneric products of fermentation, is treated with an insoluble reactive bisulfite compound, and with an insoluble ion exchange resin of the polyamine type, which latter resin may or may not contain reactive lower amino groups. This dual treatment results in removal of a large part of the acids, esters and aldehydes, and improvement of the odor and taste, so that upon vacuum or atmospheric pressure rectification of the effluent a neutral spirit or high wine of good quality is obtained.

It is known that sodium bisulfite has the power of forming an addition compound with aldehydes and ketones which, in the concentrations encountered in fermentation alcohol mashes and distillate, is soluble. However, by employing a reactive bisulfite compound insoluble in water and alcohol for treating the alcohol solution, the insoluble bisulfite compound reacts with the aldehyde to form an addition product, which is removed from solution. Also, a small amount of ester removal is accomplished. In this step of the treatment some sulfurous acid may be liberated and enter into the solution.

Although removal of aldehydes alone by treatment with the insoluble reactive bisulfite compound improves the quality of the alcohol distillate, the esters and acids also must be removed to produce a good grade of neutral spirits. In addition, if sulfurous acid is liberated in the aldehyde removal treatment its presence is objectionable. By treating the solution with a quarternary ammonium ion exchange material, a high proportion of the esters and acids is removed, and at the same time any sulfurous acid, introduced in the aldehyde removal step, is removed from the solution. The effluent solution then may be rectified at atmospheric pressure or under vacuum to the desired proof. Neutral spirits 190° proof or higher, or high wine at 100° to 159° proof, obtained in this way is of excellent quality, and contains only very small amounts of aldehyde, acids and esters. Fusel oil is not removed in the ion exchange treatments, yet in spite of the presence of fusel oil the high wine is of excellent quality. The neutral spirits obtained is comparable with the best grades of rectified neutral spirits, in taste and odor. Fusel oil may be removed, if removal is desired, in the rectification following the ion exchange treatment.

The removal of aldehydes according to this invention can take place effectively in a low-proof or high-proof solution at a pH below 7. However, the removal of esters by the quarternary ammonium ion exchange material takes place more effectively in a dilute solution below about 70° proof, or containing more than about 65% water. Thus, the high wine obtained from the atmospheric pressure distillation of a beer may be treated with the insoluble bisulfite ion exchange material to remove aldehydes, and then may be diluted and treated with the quarternary ammonium ion exchange material to remove esters; or the dilution may take place before treatment with the insoluble bisulfite ion exchange material for removal of aldehydes. If desired, the high wine may be diluted and treated with the quarternary ammonium ion exchange material followed by treatment with the reactive insoluble bisulfite material. Or, if desired, a clarified beer or other fermented mash may be subject to the ion exchange treatment, and then distilled to obtain a high wine or neutral spirits.

The insoluble reactive bisulfite compound employed in carrying out the aldehyde removal preferably is formed by treating an insoluble polyamine ion exchange resin with a dilute solution of sodium bisulfite, or other soluble bisulfite material. There is thus formed a compound exhibiting the reaction characteristics of a sodium bisulfite solution, which, however, remains insoluble in alcohol and water. By passing the distillate at any suitable proof through a column containing the insoluble reactive bisulfite material in porous form, the aldehydes are removed from the distillate with a high degree of efficiency. A reduction in aldehyde content to as low as .05 gram per hundred proof liters thus may be obtained.

We are unable to explain precisely the manner in which the sodium bisulfite is combined with the polyamine resin. It may be that the treatment of the polyamine resin with sodium bisulfite solution results in the formation of an ionized amine salt. The bisulfite radical cannot be lixiviated from the polyamine resin with water, yet the sulfurous acid group remains reactive. For this reason we believe the bisulfite radical is in an ionized state attached to the polyamine resin, and thus remains reactive, even though insoluble in water and alcohol.

We are also unable to explain definitely the manner in which the removal of esters from the alcohol solution occurs. It may be that the quaternary ammonium ion exchange material has a hydrolytic action on the esters, decomposing them into an alcohol and an acid, and then forms an insoluble salt with the acid radical, thus removing the acid from the solution. This may liberate ethyl alcohol and higher alcohols, and the higher alcohols are removed with the fusel oil fraction in the final rectification. At the same time, the quaternary ammonium resin binds the sulfurous acid and the free acids present in the distillate. This theory is substantiated by the fact that treatment with a polyamine anion exchange resin in which the amine groups are present in a form lower than the quaternary form does not remove a large part of the esters.

The invention is not limited to treatment of alcohol solutions for the removal of aldehydes and ketones, but other solutions containing aldehydes or ketones may be treated with the insoluble reactive ionized bisulfite compound, above referred to, to remove aldehydes or ketones. Also, where only aldehyde or ketone removal is desired, the treatment with the quaternary ammonium anion exchange material may be omitted; or, where it is desired to retain esters, the treatment with the reactive insoluble bisulfite material is followed by treatment with a polyamine resin consisting of amine groups lower than the quaternary form. The insoluble resinous polyamine ion exchange bisulfite addition compounds exhibiting bisulfite reactivity are new and are a part of the present invention.

A number of synthetic resin anion exchange materials commercially available are suitable for use in the present invention. Such materials are obtained for example by the reaction of a methylol-forming phenol, an alkylene polyamine and formaldehyde, according to Patent No. 2,402,384 issued June 18, 1945, to John W. Eastes. The quaternary ammonium ion exchange material also may be prepared in a manner known to the art. Anion exchange resins suitable for use in the present invention are, for example, those known commercially under the trade-marks "Amberlite IR4B"; "Nalcite SAR"; "Permutit XSAR"; and "Amberlite IRA400."

In the accompanying drawing there is diagrammatically illustrated a preferred apparatus for carrying out the invention. The invention will be described in greater detail in connection with the drawing and the following specific example illustrating the preferred operation of the invention.

Referring to the drawing, the beer rectifying column 1 receives the fermented grain mash, and a high wine ranging from about 40° to 150° proof, depending on the manner in which the column is operated, is drawn off at 2. This high wine passes to a diluting tank 3 where water is added to adjust the alcohol concentration to about 30° to 40° proof, and the diluted alcohol solution then is passed successively through a column 4 containing a porous mass of polyamine bisulfite ion exchange resin, and a column 5 containing a quaternary ammonium anion exchange resin. The dilute effluent is withdrawn at 6 and passes to a rectifying column 7, or to a column 8. Column 7 may be operated to produce neutral spirits of 190° proof or higher, and column 8 may be operated to produce a high wine of 100° to 159° proof. In producing neutral spirits, a fusel oil fraction may be withdrawn at 9, where fusel oil removal is desired.

The reactive sulfurous acid ion exchange material in column 4 is prepared by passing a dilute solution of sodium bisulfite (about 5% concentration) through the column packed with particles of "Amberlite IR4B" (a polyamine ion exchange resin), and then washing with water until the wash water contains no sulfurous acid. The high wine is diluted, preferably to 30° proof with water, and is then passed through the first column. The flow of liquid is set to provide a contact time of about twenty minutes and the temperature is about room temperature. The bed darkens in column 4 as the aldehydes are deposited therein. The effluent liquid then is passed through a second column containing "Nalcite SAR" (an insoluble quaternary ammonium ion exchange material), the contact time being about twenty minutes at room temperature. The following table shows the efficiency of removal of aldehydes, esters and acids.

| | Proof | Grams per Hundred Proof Liters | | |
| --- | --- | --- | --- | --- |
| | | Acids | Esters | Aldehydes |
| Untreated sample | 100° | 6.40 | 9.5 | 1.38 |
| After dilution and dual ion exchange treatment | 30° | 0.21 | 0.4 | 0.06 |
| Removal efficiency percent | | 96.7 | 95.8 | 95.6 |

The effluent may be rectified without removal of fusel oil to produce a high wine, or may be rectified with removal of fusel oil to produce a neutral spirit of good quality. A high wine or raw whiskey obtained by rectifying the treated sample to about 130° to 150° proof yields a product low in acid and esters and aldehydes. Rectification to 190° proof or higher with fusel oil removal produces a neutral spirit of good quality having a low ester, acid and aldehyde content. In both instances the taste and odor of the rectified product are much improved.

The bisulfite ion exchange resin is regenerated by first passing about a five per cent solution of caustic soda through the column followed by about a five per cent sodium bisulfite solution. The column then is washed to remove free sulfurous acid, and is ready for reuse. If desired, the caustic soda treatment may be preceded by treatment with about a five per cent sulfuric acid solution to lighten the color of the resin. The caustic soda decomposes the bisulfite-aldehyde addition product to liberate the aldehydes, and the treatment with dilute bisulfite solution restores the bisulfite activity of the ion exchange resin.

The quaternary ammonium ion exchange resin can be regenerated by first washing with about five per cent dilute sulfuric acid followed by washing with about five per cent caustic soda solution.

We claim as our invention:

1. In the process of removing one of the group comprising aldehydes and ketones from a solution containing the same, the step which comprises bringing the solution into intimate contact with a reactive insoluble bisulfite-polyamine ion exchange resin.

2. The process of treating an alcohol solution containing congeneric products of fermentation which comprises: contacting the solution with a reactive insoluble bisulfite material and with a quaternary ammonium anion exchange material.

3. The process as specified in claim 2 wherein the solution is below about 70° proof before treatment with the quaternary ammonium anion exchange material.

4. The process as specified in claim 2 wherein the reactive insoluble bisulfite material is the reaction product of a polyamine anion exchange resin and a soluble bisulfite.

5. The process of improving an alcohol distillate containing congeneric products of fermentation which comprises adjusting the distillate to below about 70° proof; contacting the distillate with a reactive insoluble bisulfite material; and then with a quaternary ammonium anion exchange material.

6. The process of making neutral spirits which comprises distilling a grain mesh to obtain an alcohol distillate containing congeneric products of fermentation; contacting the distillate with a reactive insoluble bisulfite material and with a quaternary ammonium ion exchange material; then rectifying the product to at least 190° proof with removal of fusel oil to produce neutral spirits.

7. The process of improving an alcohol distillate containing congeneric products of fermentation which comprises: contacting the distillate with a reaction insoluble bisulfite material; diluting the distillate to about 40° to 30° proof, and then reacting the distillate with a quaternary ammonium ion exchange material.

8. In the process of removing esters from an aqueous solution containing the same, the step which comprises bringing the solution comprising at least about 65% water into intimate contact with a quaternary ammonium ion exchange resin.

9. The process of making whiskey which comprises distilling a grain mash to obtain an alcohol distillate containing congeneric products of fermentation; contacting the distillate with a reactive insoluble bisulfite material and with a quaternary ammonium ion exchange material; then rectifying the product to above 100° proof.

10. The process as specified in claim 9, wherein rectification is carried out to between 100° to 159° proof with removal of fusel oil.

EARL D. UNGER.
LE ROY A. SMITH.
HERMAN F. WILLKIE.

References Cited in the file of this patent

UNITED STATES PATENTS

| Number | Name | Date |
| --- | --- | --- |
| 2,223,930 | Griessbach et al. | Dec. 3, 1940 |
| 2,258,216 | Ramage | Oct. 7, 1941 |
| 2,285,750 | Swain | June 9, 1942 |
| 2,341,907 | Cheetham et al. | Feb. 15, 1944 |
| 2,419,628 | Cohen | Apr. 29, 1947 |
| 2,469,683 | Dudley et al. | May 10, 1949 |
| 2,500,171 | Gause | Mar. 14, 1950 |
| 2,520,189 | Zarow | Aug. 29, 1950 |